(12) United States Patent
Roos et al.

(10) Patent No.: US 6,528,761 B1
(45) Date of Patent: Mar. 4, 2003

(54) APPARATUS FOR DETERMINING THE POSITION OF THE FOCAL POINT IN A LASER MACHINING SYSTEM

(75) Inventors: Sven-Olov Roos, Lerum (SE);
Per-Arne Torstensson, Kungsbacka (SE)

(73) Assignee: Permanova Lasersystem AB, Ostersund (SE)

( * ) Notice: Subject to any disclaimer, the term of this patent is extended or adjusted under 35 U.S.C. 154(b) by 0 days.

(21) Appl. No.: 09/674,805

(22) PCT Filed: May 5, 1999

(86) PCT No.: PCT/SE99/00756
§ 371 (c)(1),
(2), (4) Date: Feb. 15, 2001

(87) PCT Pub. No.: WO99/59764
PCT Pub. Date: Nov. 25, 1999

(30) Foreign Application Priority Data

May 7, 1998 (SE) ................................................ 9801590

(51) Int. Cl.[7] ............................................... B23K 26/04
(52) U.S. Cl. .......................... 219/121.83; 219/121.73; 250/201.2
(58) Field of Search ........................ 219/121.73, 121.75, 219/121.83, 121.8, 121.74; 250/201.1, 201.2

(56) References Cited

U.S. PATENT DOCUMENTS

| | | | |
|---|---|---|---|
| 4,983,796 A | 1/1991 | Griffaton | 219/121.62 |
| 5,118,922 A | 6/1992 | Rothe | 250/201.2 |
| 5,166,504 A | 11/1992 | Protz, et al. | 250/201.1 |
| 5,463,202 A | * 10/1995 | Kurosawa et al. | 219/121.83 |
| 5,521,374 A | * 5/1996 | Cray et al. | 250/201.2 |
| 5,609,780 A | * 3/1997 | Freedenberg et al. | 219/121.83 |
| 5,670,773 A | * 9/1997 | Planeix | 250/201.2 |
| 5,850,068 A | * 12/1998 | Peters et al. | 219/121.83 |
| 6,151,109 A | * 11/2000 | Bromssen et al. | 219/121.83 |
| 6,163,010 A | * 12/2000 | Kobsa | 219/121.61 |
| 6,316,764 B2 | * 11/2001 | Heffner et al. | 250/201.1 |

FOREIGN PATENT DOCUMENTS

| | | |
|---|---|---|
| DE | 41 40 182 | 6/1993 |
| DE | 43 36 136 | 7/1994 |
| EP | 0 364 366 | 4/1990 |
| EP | 0 421 135 | 4/1991 |
| EP | 0 811 453 | 12/1997 |
| JP | 2-259711 A | * 10/1990 ............. 250/201.1 |
| WO | WO 95/27188 | 10/1995 |

* cited by examiner

*Primary Examiner*—Geoffrey S. Evans
(74) *Attorney, Agent, or Firm*—Connolly Bove Lodge & Hutz LLP

(57) ABSTRACT

An apparatus for determining the position of the focal point of a laser beam in a laser machining system in which the laser beam is transmitted via an optical fiber to the workpiece to be machined by the laser beam. The z coordinate position of the focal point is determined by a mirror for reflecting some of the laser radiation back towards the end surface of the optical fiber, and a detector is arranged between the laser and the outgoing fiber for measuring the radiation reflected back through the fiber.

16 Claims, 4 Drawing Sheets

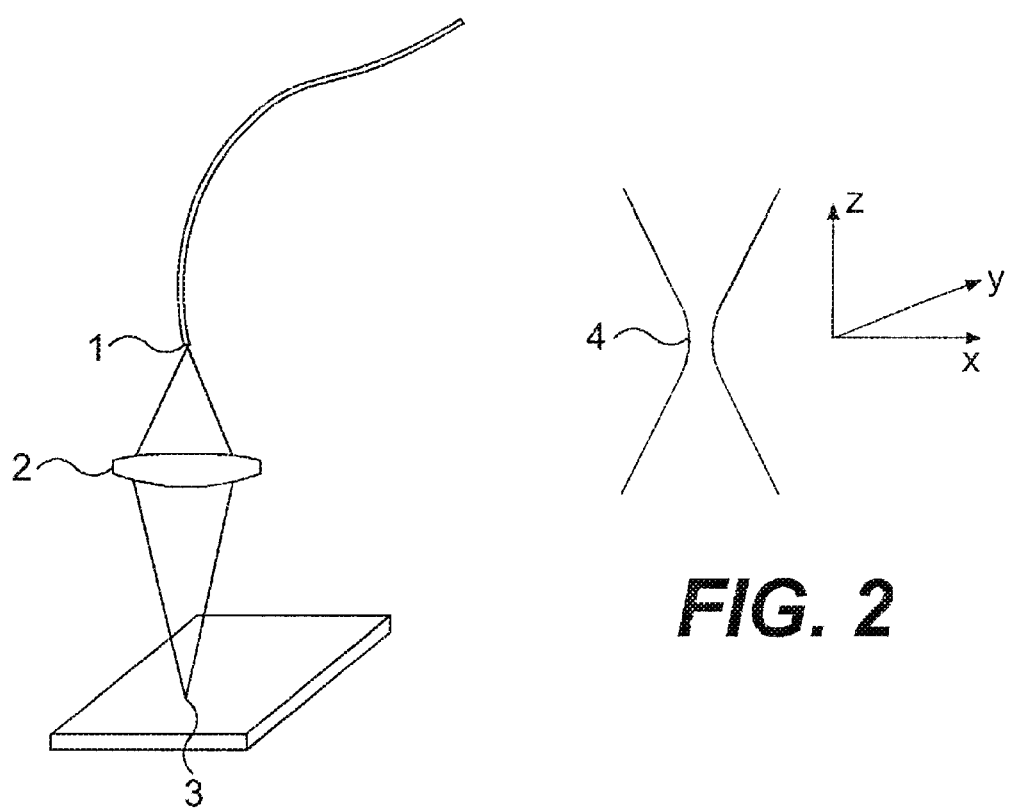
FIG. 1
FIG. 2
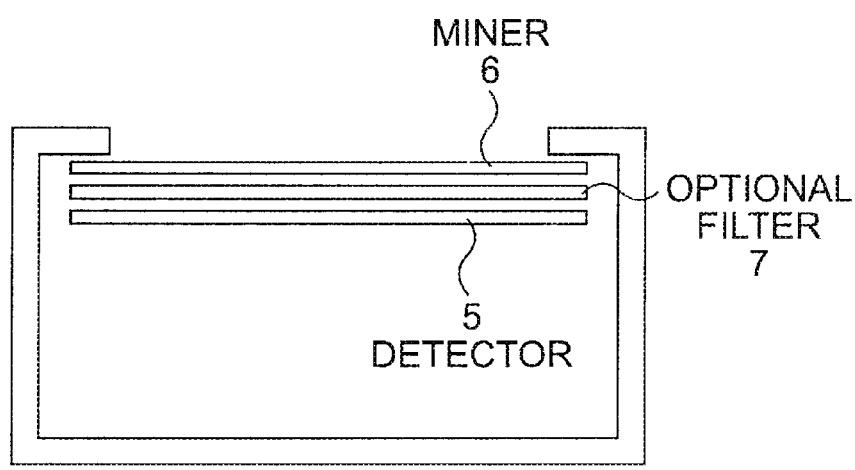
FIG. 3

APPARATUS FOR DETERMINING THE POSITION OF THE FOCAL POINT IN A LASER MACHINING SYSTEM

TECHNICAL FIELD

The present invention relates to an apparatus for determining the position of the focal point in a laser machining system in which a laser beam is transmitted via an optical fibre to a workpiece to be machined by the laser beam.

BACKGROUND OF INVENTION

In laser material processing systems the laser beam is focused on a small area (spot) so that the high energy intensity can be used to machine (vaporize) the workpiece material. Laser machining systems are frequently used for cutting, welding and marking operations in the manufacturing industry. Thanks to the recent development of optical fibre technique such laser machining stations are designed with flexible transmission of the laser beam to the workpiece by means of optical fibres. In many cases a machining head is mounted in the arm of an articulated robot for manipulating the laser beam relative to the workpiece.

In a system in which the laser beam is fixed and the workpiece is moved, it is usually no problem to determine the position of the focus point of the laser beam. However, in case of a 7-axes robot manipulating the beam the determination is more difficult. For instance by collisions, exchange of optical components or robot maintenance the focal point might be displaced and the position has to be adjusted. Such adjustments, however, are usually troublesome and time-consuming The z coordinate position of the focal point is often displaced in high power machining systems if the optical system is not the best. Such displacement has usually not been considered in prior adjustment systems, due to the fact that the adjustments in such cases must be carried out at full laser power conditions.

BRIEF SUMMARY OF THE INVENTION

It is an object of this invention to provide an improved apparatus for determining the position of the focal point in z as well as in the x and y coordinates.

It is a further object of this invention to provide an apparatus for determining the position of the focal point in the z coordinate also at full laser power condition.

BRIEF DESCRIPTION OF THE DRAWINGS

In the following a preferred embodiment of the invention will be described more in detail with reference to the accompanying drawings in which FIG. 1 illustrates an optical fibre machining head, FIG. 2 illustrates the shape of an focused laser beam, FIG. 3 illustrates a detector for determining the waist of the laser beam in x, y and z coordinates.

DETAILED DESCRIPTION OF THE INVENTION

Figure 4A:
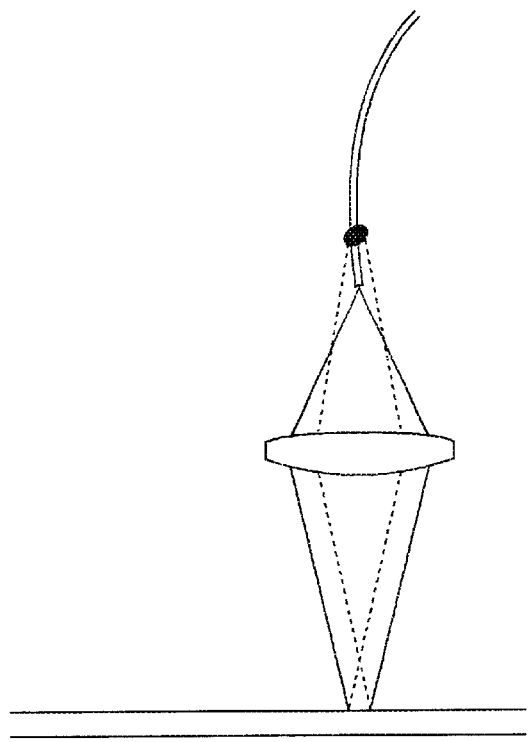
FIG. 4 illustrates three different cases (A, B and C) for the image of the end surface of the fibre on a mirror.

FIG. 1 illustrates schematically an optical fibre machining head. A laser beam is transmitted from a laser source, not illustrated here, via an optical fibre to the workpiece to be machined. The end surface 1 of the optical fibre, ie the end surface of the fibre faced to the workpiece, is imaged on the workpiece 3 by means of optics 2.

The shape of the focused laser bean is illustrated in FIG. 2. The beam converges to a minimal sectional area and then diverges with the same angle. The object of the invention is to determine this waist 4 in the z coordinate as well as in the x and y cordinates.

FIG. 3 illustrates a detector for determining the x, y and z coordinates. The main part is a position sensitive detector plate 5 covered by a mirror 6 and possibly a damping filter 7 therebetween. The mirror has a specific transmission for the wave-length in question. The x and y coordinates are then determined by means of the position sensitive detector plate 5, which for instance could be of the type lateral photo diode or a CCD-array. In order to obtain a suitable signal level in some cases it is necessary to insert a damping filter 7 between the mirror 6 and the detector plate 5. The z coordinate (ie perpendicular to the plane of the detector plate) can be determined by adjusting either the detector or the focusing optics along the z axis and then take into account that part of the radiation which is reflected back through the fibre to the laser.

Figure 4B:
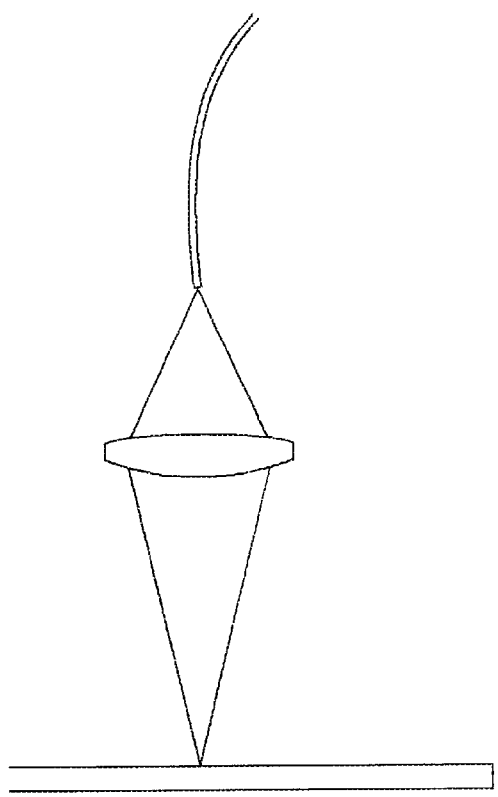
Figure 4C:
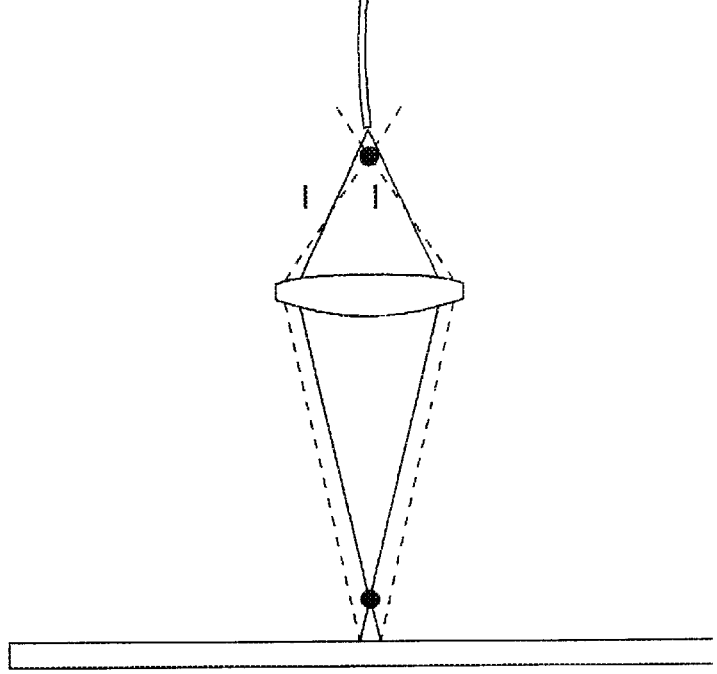

FIG. 4A illustrates a case in which the image of the end surface of the fibre is located below the surface of the mirror. The back-reflected image is then located behind (above in the figure) the end position of the fibre, and there is only a small part of the reflected laser radiation which is transmitted back through the fibre. FIG. 4C illustrates a corresponding situation in which the image of the end surface of the optical fibre is located above the surface of the mirror. The back-reflected image is then located in front of (below in the figure) the end surface of the fibre and, again, there is only a small part of the reflected radiation that is transmitted back through the fibre. FIG. 4B illustrates a case in which the image of the end surface of the optical fibre is located on the surface of the mirror. This means that the back-reflected image will be located on the end surface of the optical fibre and substantially all of the back-reflected radiation (beam power) will then also be transmitted back through the fibre. By looking for the maximum of the back-reflected radiation, ie the radiation that emerges from the end surface of the optical fibre on the laser side, the z coordinate position of the focus point could be determined.

The detection itself of the back-reflected radiation can be carried out in different ways, for instance:

Detection of Back-reflected Radiation, Alternative 1

Figure 5A:
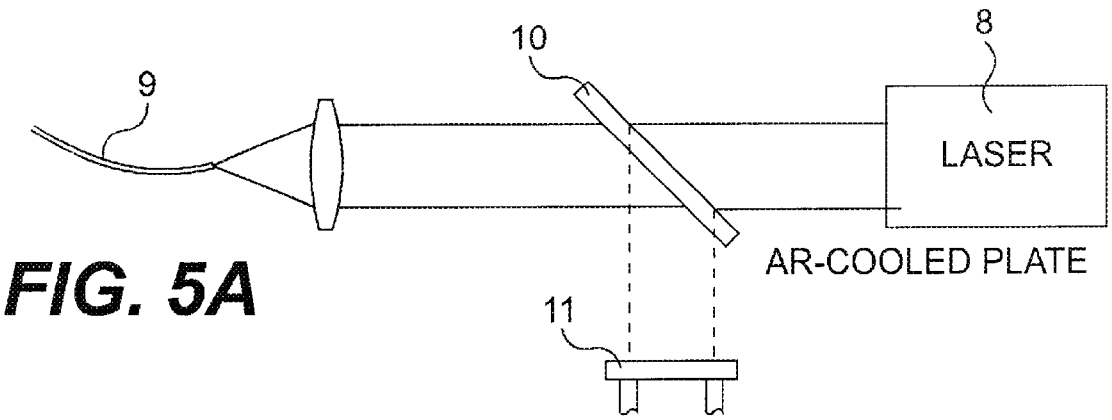
FIG. 5A is a first example of the detection of back-reflected radiation according to the invention.

The principle is illustrated in FIG. 5A. An angular, anti-reflex coated plate 10 is arranged in the beam path between the laser 8 and the outgoing fibre 9. Back-reflected radiation is detected through the residual reflection on the plate by means of a detector 11.

Detection of Back-reflected Radiation, Alternative 2

Figure 5B:
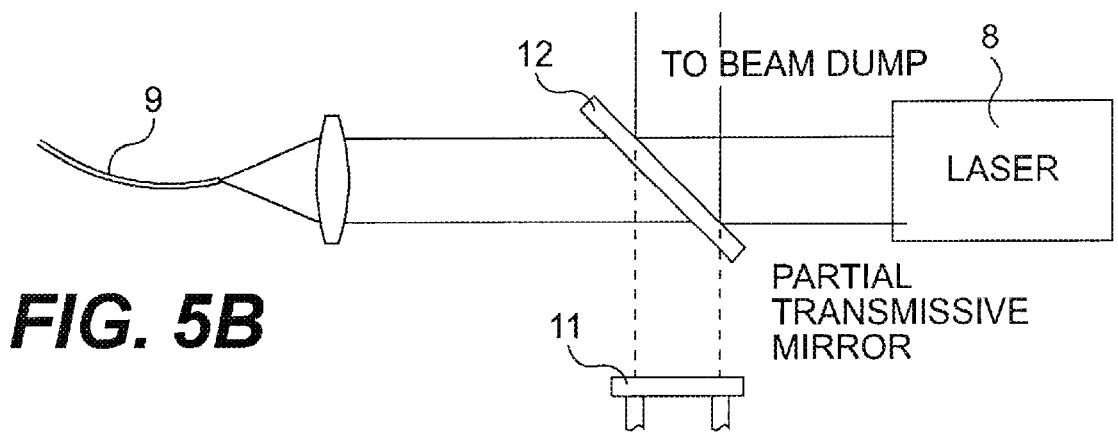
FIG. 5B is another example of the detection of back-reflected radiation according to the invention.

The principle is illustrated in FIG. 5B. In order to avoid a too high power density a damping unit 12 in the form of one or more partial transmissive mirror plates are arranged in the beam path between the laser 8 and the outgoing fibre 9. The damping unit 12 is angulated as in FIG. 5A and the back-reflected radiation will be reflected by the damping unit 12 and detected by detector 11.

Detection of Back-reflected Radiation, Alternative 3

Figure 5C:
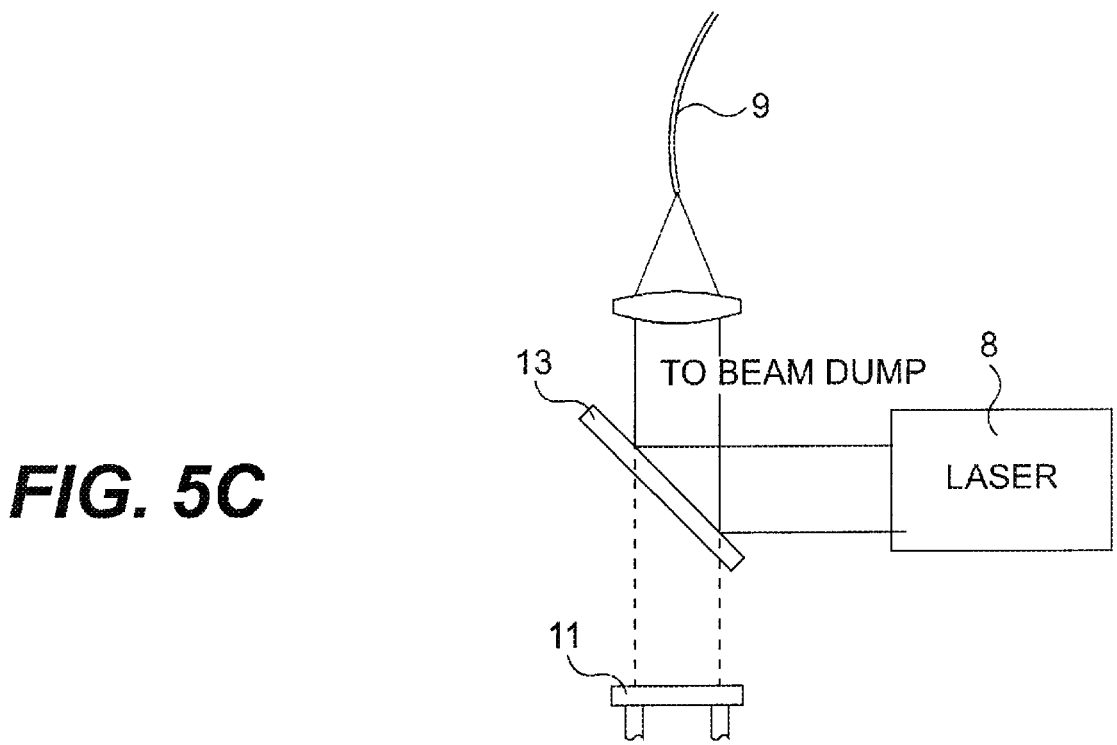
FIG. 5C is another example of the detection of back-reflected radiation according to the invention.

The principle is illustrated in FIG. 5C. The laser beam is deviated by means of a mirror 13 towards the optical fibre 9. The mirror has a small amount of optical leakage which means that back-reflected radiation can be detected behind the mirror by means of a detector 11.

The detector 11 which detects the residual radiation can be of the photo diode type or a thermal sensor. Such detectors are known per se and will not be described in any detail here.

Figure 6B:
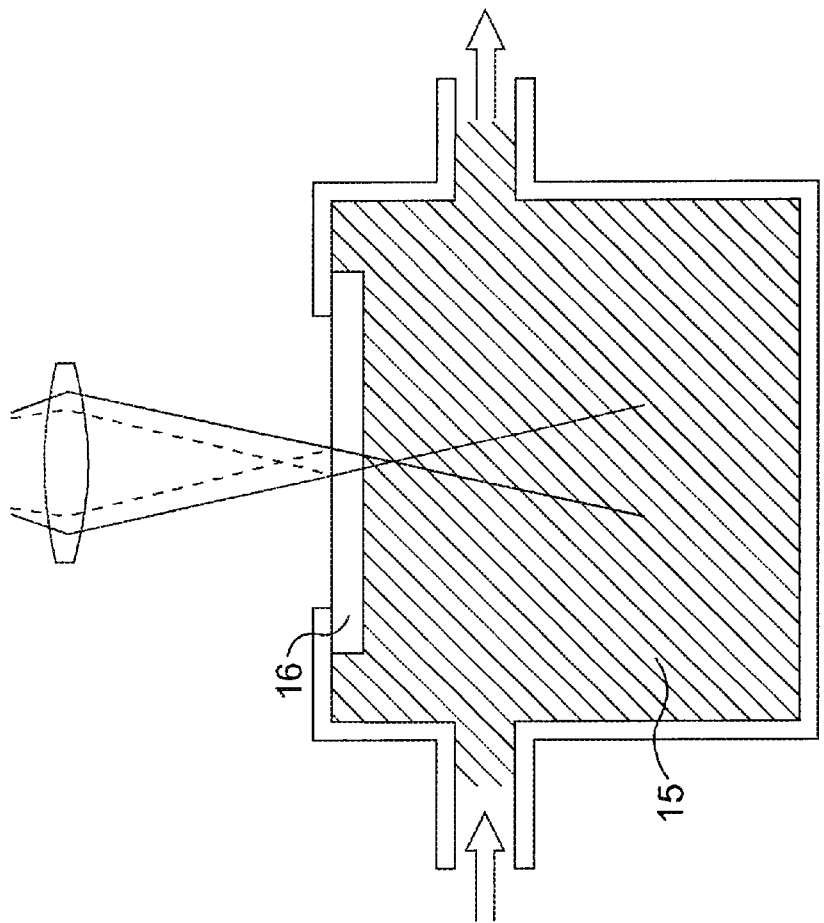
FIG. 6B is another example with a direct liquid cooling for determining the position of the focal point at full laser power condition.
Figure 6A:
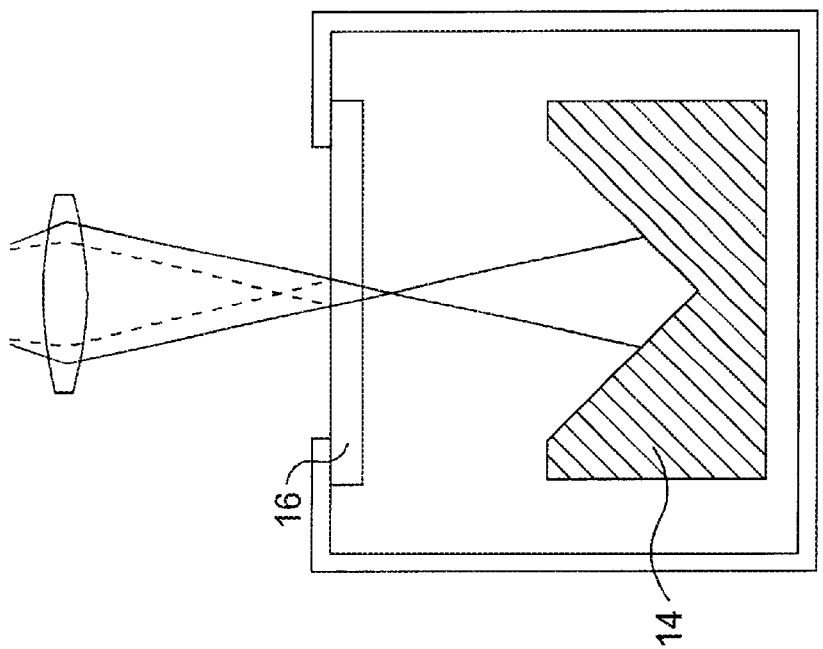
FIG. 6A illustrates an embodiment with a so-called beam dump for determining the position of the focal point at full laser power condition.

When determining the z coordinate position of the focal point for a laser operating at full power it is preferred to use a detecting mirror 16 having a low reflection only. The reflecting surface of the mirror must withstand high power densities, which means that the type of material is critical. In case of Nd-YAG laser radiation, uncoated quartz is recommended as it has a reflection of 3,5% only. If also the back side of the mirror is cooled by means of a suitable liquid, the reflection on the rear surface will not disturb, the measuring operation. In FIG. 6A there is one embodiment illustrated in which a so-called beam dump 14 is arranged below the measuring mirror, and in FIG. 6B an alternative embodiment with a direct liquid coolant 15 is illustrated.

The invention is not limited to the Illustrated examples but can be varied within the scope of the accompanying claims.

What is claimed is:

1. An apparatus for determining the position of the focal point of a laser beam comprising an optical fiber to transmit a laser beam from a laser source, a mirror having a certain transmission for the wavelength of the laser beam radiation and arranged adjacent to a workpiece to be machined to reflect some of the radiation back towards an end surface of the optical fiber, a detector arranged between the laser source and an opposite end of the optical fiber for measuring the radiation reflected back through the fiber, and a position sensitive detector arranged behind the mirror to determine the x and y coordinate position of the focal point.

2. An apparatus according to claim 1 further comprising a damping filter arranged between the mirror and the position sensitive detector to obtain a suitable signal level for the detector.

3. An apparatus according to claim 2 wherein the mirror, the position sensitive detector, and the damping filter are included in a detector housing, wherein the detector housing or an optics lens used to focus the laser beam is movable along the z axis to determine the z coordinate position of the focal point by looking for the maximum of the laser radiation received back through the optical fiber.

4. An apparatus according to claim 1 further comprising an angulated, anti-reflex coated mirror plate arranged in the beam path between the laser source and the opposite end of the fiber for deviating radiation to said detector.

5. An apparatus according to claim 1 further comprising an angulated damping member having one or more partial transmissive mirror plates for deviating radiation to said detector.

6. An apparatus according to claim 1 further comprising a deviating mirror with optical leakage for deviating radiation to said detector.

7. An apparatus according to claim 1 wherein the mirror comprises a relatively low-reflective material to resist high power densities and to enable the position of the focal point to be determined at full laser power operation.

8. An apparatus according to claim 1 wherein the mirror is directly cooled by a suitable coolant.

9. An apparatus according to claim 1 further comprising a beam-dump arranged below the back side of the mirror.

10. An apparatus for determining the position of the focal point of a laser beam comprising:

an optical fiber to transmit a laser beam from a laser source with one end proximate to a workpiece to be machined and an opposite end proximate to the laser source;

a mirror arranged adjacent to the workpiece to reflect some of the radiation back towards the end proximate to the workpiece;

a detector arranged between the laser source and the end of the fiber proximate to the laser source for measuring the radiation reflected back through the fiber;

a position sensitive detector arranged behind the mirror to determine the x and y coordinate position of the focal point of the laser beam in relation to the workpiece; and a damping filter arranged between the mirror and the position sensitive detector to obtain a suitable signal level for the detector.

11. An apparatus according to claim 10 wherein the mirror, the position sensitive detector, and the damping filter are included in a detector housing, wherein the detector housing is movable along the z axis to determine a z coordinate position of the focal point by looking for the maximum of the laser radiation received back through the optical fiber.

12. An apparatus according to claim 10 further comprising an optics lens disposed between the end of the optical fiber proximate to the workpiece and the workpiece that is movable along the z axis to adjust the z coordinate position of the focal point relative to the workpiece.

13. An apparatus according to claim 10 further comprising an angulated damping member having one or more partial transmissive mirror plates for deviating radiation to said detector.

14. An apparatus according to claim 10 further comprising a deviating mirror with optical leakage for deviating radiation to said detector.

15. An apparatus according to claim 10 wherein the mirror comprises a relatively low-reflective material to resist high power densities and to enable the position of the focal point to be determined at full laser power operation.

16. An apparatus according to claim 10 further comprising a beam-dump arranged beneath the mirror in relation to the workpiece.

* * * * *